(12) United States Patent
Villaume et al.

(10) Patent No.: US 7,908,043 B2
(45) Date of Patent: Mar. 15, 2011

(54) METHOD AND DEVICE FOR ACTIVE CONTROL OF THE ROLL OF AN AIRCRAFT

(75) Inventors: Fabrice Villaume, Toulouse (FR); David Chabe, Toulouse (FR); Stephane Delannoy, Pujaudran (FR)

(73) Assignee: Airbus France, Toulouse (FR)

( * ) Notice: Subject to any disclaimer, the term of this patent is extended or adjusted under 35 U.S.C. 154(b) by 670 days.

(21) Appl. No.: 11/949,233

(22) Filed: Dec. 3, 2007

(65) Prior Publication Data
US 2008/0133071 A1    Jun. 5, 2008

(30) Foreign Application Priority Data

Dec. 5, 2006   (FR) .................................... 06 10595

(51) Int. Cl.
*G05D 1/08*   (2006.01)

(52) U.S. Cl. ............................... 701/4; 701/8; 244/76 R
(58) Field of Classification Search .................. None
See application file for complete search history.

(56) References Cited

U.S. PATENT DOCUMENTS

| 4,460,858 A | 7/1984 | Ashland |
| 5,008,825 A | 4/1991 | Nadkarni |
| 2007/0246605 A1 | 10/2007 | Lavergne et al. |

FOREIGN PATENT DOCUMENTS

FR    2874204    2/2006

OTHER PUBLICATIONS

Preliminary Search Report dated Aug. 21, 2007 (completion date).

*Primary Examiner* — Michael J. Zanelli
(74) *Attorney, Agent, or Firm* — Dickinson Wright PLLC

(57) ABSTRACT

A control device a determination device for determining a roll objective, and a calculation device for calculating, on the basis of the roll objective, a deflection order which is applied exclusively to ailerons of the aircraft.

18 Claims, 1 Drawing Sheet

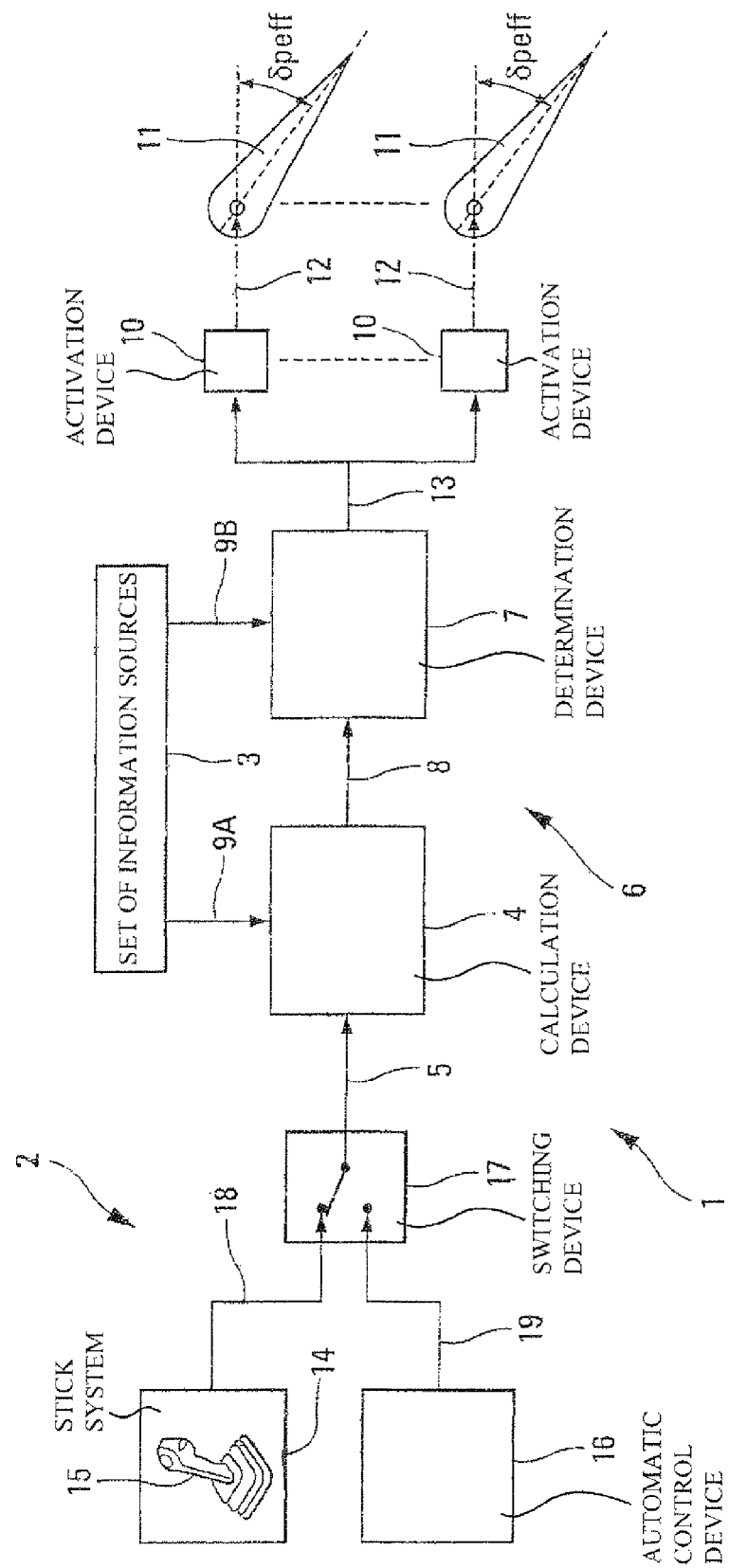

though the wings of the aircraft are flat.

METHOD AND DEVICE FOR ACTIVE CONTROL OF THE ROLL OF AN AIRCRAFT

TECHNICAL FIELD OF THE INVENTION

The present invention relates to a method and a device for carrying out active control of the roll of an aircraft, in particular of a transport aircraft.

BACKGROUND OF THE INVENTION

It is known that the roll dynamics of an aircraft are sensitive to external disturbances (wind, ground effect, etc.), to its inherent characteristics (mass, centering, aerodynamic configuration, unloading of the landing gear, swinging of the bogies, characteristics of the landing gear shock absorbers, track and wheelbase of the main gear, etc.), and an engine fault. The pilot's workload is thus increased to obtain accurate piloting so as to hold the wings as flat as possible during the takeoff run (up to the unloading of the main gear) and the landing run (after impact of the main gear).

SUMMARY OF THE INVENTION

The object of the present invention is in particular to control and stabilize the lateral attitude of an aircraft on the ground, throughout its speed range. It is known that, on an aircraft possessing a fairly low roll stability, in general because of landing gear that are relatively close together (with respect to the wingspan of the aircraft), a direct roll command (with the aid of a standard control stick) does not enable the pilot of the aircraft to readily stabilize its lateral attitude. Because of the potentially critical consequences of a lateral attitude setting (engine ground scrape, runway exit, etc.), the pilot then tends to overpilot, which, on an aircraft with low stability, may very quickly generate a divergent coupling which is to be proscribed.

DETAILED DESCRIPTION OF THE INVENTION

The present invention relates to method of active control of the roll of an aircraft, which makes it possible to remedy the aforesaid drawbacks.

For this purpose, according to the invention, said method is noteworthy in that:
a) a roll objective is generated, which is expressed in the form of a roll parameter related to the roll and which must be applied to the aircraft. Advantageously, said roll objective is expressed as a roll angle or roll rate;
b) the effective values of parameters of the aircraft are determined, specified hereinbelow;
c) on the basis of said roll objective and of said effective values, a deflection order δp is calculated; and
d) said deflection order δp is applied exclusively to airfoils of the aircraft, which are efficient on the roll axis (ailerons, spoilers, etc.), so as to control the roll.

The present invention may be applied during various situations of the aircraft, and in particular:
during a flareout while landing; or
during a run following a landing.

However, in a preferred application, said method is used during a run and a rotation with a view to a takeoff with the aim of controlling the lateral inclination of the aircraft during this run in such a way that this maneuver can be carried out with the wings of the aircraft flat.

The method in accordance with the present invention can be applied equally well to a manual guidance mode and to an automatic guidance mode (implemented by an automatic control means).

Preferably, in step d), the deflection order δp is applied exclusively to ailerons of the aircraft. Thus, to control the roll, other control elements such as spoilers in particular are not acted on so as not to increase the drag. An increase in the drag would in fact have the consequence of degrading the performance of the aircraft, and in particular of increasing the takeoff distance during a takeoff phase.

Advantageously, in step a), said roll objective is generated by an automatic control means of the aircraft and/or by a stick system comprising a roll control stick (which is able to be actuated by a pilot of the aircraft).

DESCRIPTION OF THE PREFERRED EMBODIMENTS

In a first embodiment, in the aforesaid step c), the following operations are carried out:
c1) a roll acceleration order is calculated on the basis of said roll objective; and
c2) said deflection order δp is calculated with the aid of the following expressions:

$$\begin{cases} \delta p = (P1 - F + \Delta RMI)/G \\ F = \rho \cdot V^2 \cdot S \cdot \ell \cdot C \cdot \ell/2 \cdot I \\ G = \rho \cdot V^2 \cdot S \cdot \ell \left(\frac{\partial C\ell}{\partial \delta p}\right) / 2 \cdot I \\ \Delta RMI = K \cdot \left(-Peff + \int (F + G \cdot \delta peff - \Delta RMI) \cdot dt\right) \end{cases}$$

in which:
P1 represents said roll acceleration order;
ρ is the density of the air;
V is the speed of the aircraft;
S is a reference area of the aircraft;
l is a reference length of the aircraft;
Cl represents a roll coefficient;
I represents the roll inertia of the aircraft;
∂Cl/∂δp represents an effectiveness coefficient;
K represents a predetermined coefficient;
Peff represents the effective value of the roll rate;
∫ illustrations an integration function; and
δpeff is the effective deflection angle of said ailerons of the aircraft.

In this case, advantageously:
the effective value Peff of said roll rate is measured; and
in step c1), said roll acceleration order P1 is calculated with the aid of the following expression:

$P1 = \omega \cdot (PO - Peff)$ in which:
PO represents said roll objective; and
ω represents an adjustable angular frequency.

It will be noted that the control of an aircraft by roll objective, implemented by the method in accordance with the invention, allows the pilot (both human and automatic) to control in a robust and repetitive manner the roll dynamics of the aircraft during the takeoff run, as well as on landing. As regards the pilot (human or automatic), keeping the wings flat is made much easier during these critical phases of the flight. This solution does not use the spoilers and therefore avoids degrading the takeoff performance.

Additionally, in a preferred embodiment, said roll coefficient Cl is determined with the aid of a neural net and/or said effectiveness coefficient ∂Cl/∂δl is determined with the aid of a neural net. It is known that a neural net specified hereinbelow is an artificial intelligence system, whose structure and manner of operation attempt to imitate the human brain, more particularly its network of neurons.

Thus, by virtue of this preferred embodiment, particularly accurate coefficients Cl and ∂Cl/∂δl may be obtained.

Additionally, in a second embodiment, in the aforesaid step c), said deflection order δp is calculated with the aid of the following expression:

$$\delta p = Ka.\int(\phi com - \phi eff).dt + Kb.\phi eff + Kc.Peff$$

in which:
Ka, Kb and Kc are predetermined coefficients;
∫ illustrates an integration function;
φeff is the effective value of the lateral attitude of the aircraft;
Peff is the effective value of the roll rate of the aircraft; and
φcom is a controlled value of the lateral attitude, which is determined with the aid of said roll parameter.

Preferably, said effective value φeff of the lateral attitude is limited by predetermined threshold values, in particular so as not to needlessly extend airfoils on a cambered runway.

In a particular embodiment, a direct deflection order is moreover calculated, and is applied at one and the same time to said ailerons and to spoilers of the aircraft. However, the spoilers are only used in extreme cases and during manual piloting.

The present invention also relates to a device for carrying out active control of the roll of an aircraft, in particular of a transport aircraft.

According to the invention, said device is noteworthy in that it comprises:
  means for generating a roll objective, which is expressed in the form of a roll parameter related to the roll and which must be applied to the aircraft;
  means for measuring the effective values of parameters (speed, roll rate, deflection angles, etc.) of the aircraft;
  calculation means for calculating, on the basis of said roll objective and of said effective values, a deflection order; and
  means for actuating airfoils of the aircraft which are efficient on the roll axis, preferably ailerons, to which is transmitted said deflection order δp which is applied exclusively to said airfoils with the aim of controlling the roll of the aircraft.

In a first embodiment, said calculation means comprise:
means for calculating, on the basis of said roll objective, a roll acceleration order; and
means for calculating said deflection order δp with the aid of the following expressions:

$$\begin{cases} \delta p = (P1 - F + \Delta RMI)/G \\ F = \rho \cdot V^2 \cdot S \cdot \ell \cdot C \cdot \ell/2 \cdot I \\ G = \rho \cdot V^2 \cdot S \cdot \ell \left(\frac{\partial C\ell}{\partial \delta p}\right)\!/2 \cdot I \\ \Delta RMI = K \cdot \left(-Peff + \int (F + G \cdot \delta peff - \Delta RMI) \cdot dt\right) \end{cases}$$

in which:
P1 represents said roll acceleration order;
ρ is the density of the air;
V is the speed of the aircraft;
S is a reference area of the aircraft;
l is a reference length of the aircraft;
Cl represents a roll coefficient;
I represents the roll inertia of the aircraft;
∂Cl/∂δp represents an effectiveness coefficient;
K represents a predetermined coefficient;
Peff represents the effective value of the roll rate;
∫ illustrates an integration function; and
δpeff is the effective deflection angle of ailerons of the aircraft.

Furthermore, in a second embodiment, said calculation means are formed in such a way as to calculate said deflection order δp with the aid of the following expression:

$$\delta p = Ka.\int(\phi com - \phi eff).dt + Kb.\phi eff + Kc.Peff$$

in which:
Ka, Kb and Kc are predetermined coefficients;
∫ illustrates an integration function;
φpeff is the effective value of the lateral attitude of the aircraft;
Peff is the effective value of the roll rate of the aircraft; and
φcom is a controlled value of the lateral attitude, which is determined with the aid of said roll parameter.

BRIEF DESCRIPTION OF THE DRAWING

The single FIGURE of the appended drawing will elucidate the manner in which the invention may be embodied. This single FIGURE is the schematic diagram of a device in accordance with the invention.

The device 1 in accordance with the invention when represented diagrammatically in the FIGURE is intended to carry out active control of the roll of an aircraft, in particular of a transport aircraft.

According to the invention, said device 1 which is carried onboard the aircraft comprises:
  means 2 for generating a roll objective which is expressed in the form of a roll parameter (related to the roll) and which must be applied to the aircraft. This roll objective is expressed either in terms of roll angle, or in terms of roll rate (roll angle per second);
  a set 3 of information sources specified hereinbelow, which measure in particular the effective values of various parameters of the aircraft;
  means 6 specified hereinbelow, which are connected to said means 2 and to said set 3 and which are formed in such a way as to calculate, on the basis of said roll objective and of said effective values, a deflection order δp; and
  means 10 for actuating airfoils efficient on the roll axis, preferably standard ailerons 11 of the aircraft. These actuation means 10 are formed in such a way as to impose on said airfoils (ailerons 11), as illustrated by a chain-dotted link 12, a particular deflection position. In the example and in the situation of the FIGURE, the ailerons 11 exhibit an effective deflection angle δpeff. According to the invention, the deflection order δp determined by the means 6 is transmitted to said actuation means 10 by way of a link 13 so that these actuation means 10 apply this deflection order δp to said airfoils efficient on the roll axis (preferably to said ailerons 11), and exclusively to them.

The present invention may be applied during various situations of the aircraft, and in particular:
  during a flareout while landing; or
  during a run following a landing.

However, in a preferred application, said device 1 is used during a run of the aircraft on a runway with a view to a takeoff, with the aim of controlling the lateral inclination of the aircraft during this run. The control of the roll is then such that this maneuver is carried out with the wings of the aircraft flat. More precisely, one seeks to keep the lateral inclination close to zero during the rotation.

The device 1 in accordance with the invention can be applied equally well to a manual guidance mode and to an automatic guidance mode (implemented by a standard automatic control means).

According to the invention, the deflection order δp is applied, preferably, exclusively to the ailerons 11 of the aircraft. Thus, to achieve active control of the roll, the device 1 does not act on other aerodynamic control elements such as spoilers in particular so as not to increase the drag. An increase in the drag would in fact have the consequence of degrading the performance of the aircraft, and in particular of increasing the takeoff distance during a takeoff phase.

In a particular embodiment, said means 2 comprise:
- a stick system 14 which comprises at least one roll control stick 15, capable of being actuated in a standard manner by a pilot of the aircraft. The amplitude of actuation of said control stick 15 is converted by this stick system 14 into a value of roll angle or of roll rate which corresponds to the aforesaid roll objective;
- an automatic control means 16 which automatically determines, in a standard manner, a roll objective; and
- switching means 17 which are connected by way of links 18 and 19 respectively to said stick system 14 and to said automatic control means 16 and which connect the means 4 in a standard manner as a function of particular parameters, either to said stick system 14, or to said automatic control means 16.

In a first embodiment, said means 6 comprise, as represented in the FIGURE:
- means 4 which are connected by way of links 5 and 9A respectively to said means 2 and to said set 3 and which are formed in such a way as to calculate, on the basis of the roll objective received from said means 2 and of values specified hereinbelow received from said set 3, a roll acceleration order P1; and
- means 7 which are connected by way of links 8 and 9B respectively to said means 4 and to said set 3 and which are formed in such a way as to calculate said deflection order δp.

In this first embodiment, said means 7 are formed in such a way as to calculate said deflection order δp with the aid of the following expressions:

$$\begin{cases} \delta p = (P1 - F + \Delta RMI)/G \\ F = \rho \cdot V^2 \cdot S \cdot \ell \cdot C \cdot \ell/2 \cdot I \\ G = \rho \cdot V^2 \cdot S \cdot \ell \left(\frac{\partial C\ell}{\partial \delta p}\right)/2 \cdot I \\ \Delta RMI = K \cdot \left(-Peff + \int (F + G \cdot \delta peff - \Delta RMI) \cdot dt\right) \end{cases}$$

in which:
P1 represents said roll acceleration order, received from said means 4;
ρ is the density of the air, which is known;
V is the speed of the aircraft, which is measured on the aircraft;
S is a reference area of the aircraft, which is known for the aircraft considered;
l is a reference length of the aircraft, which represents the mean aerodynamic chord and which is known for the aircraft considered;
Cl represents a roll coefficient, which is calculated in the manner specified hereinbelow;
I represents the roll inertia of the aircraft;
∂Cl/∂δp represents an effectiveness coefficient, which is calculated in the manner specified hereinbelow;
K represents a predetermined coefficient;
Peff represents the effective value of the roll rate, which is measured on the aircraft;
∫ illustrates an integration function; and
δpeff is the effective deflection angle of said ailerons 11, which is measured on the aircraft.

The values V, Peff and δpeff are measured with the aid of standard means forming part of said set 3 of information sources. In particular, V and δpeff may be measured by appropriate sensors and Peff may be determined by an inertial platform.

In a particular embodiment:
said set 3 of information sources comprises means (in particular an inertial platform) capable of measuring on the aircraft the effective value Peff of said roll rate; and
said means 4 calculate said roll acceleration order P1, with the aid of the following expression:

$$P1 = \omega \cdot (PO - Peff)$$

in which:
PO represents said roll objective received from said means 2; and
ω represents an adjustable angular frequency.

Additionally, in a preferred embodiment, said means 7 determines said roll coefficient CR and said effectiveness coefficient ∂Cl/∂δp with the aid on each occasion of a neural net. The principle of the neural net used may be generalized by;

$$\forall j \cdot 1 \leq j \leq ns, \; y^j = \Phi\left(\sum_{i=o}^{i=ne} u_j^i \cdot x^i\right)$$

The neural nets used are simple-layer nets. The activation function Φ (x) satisfies, preferably, the following relation:

$$\Phi(x) = 1/(1+|x|)$$

in which x represents the input of the activation function.

Such a neural net is described in particular in a document entitled "Neural Networks—Contribution to Modeling for Flight Control", published on the occasion of the "World Aviation Congress" which was held in Reno (United States) in 2004.

Thus, by virtue of the use of neural nets, particularly accurate coefficients Cl and ∂Cl/∂δp may be obtained, thereby making it possible to increase the effectiveness of the roll control device 1.

Additionally, in a second embodiment, said means 6 are formed in such a way as to calculate said deflection order δp with the aid of the following expression:

$$\delta p = Ka \cdot \int (\phi com - eff) \cdot dt + Kb \cdot \phi eff + Kc \cdot Peff$$

in which:
Ka, Kb and Kc are predetermined coefficients;
∫ illustrates an integration function;
φeff is the effective value of the lateral attitude of the aircraft;
Peff is the effective value of the roll rate of the aircraft; and φcom is a controlled value of the lateral attitude. This value φcom is determined on the basis of the roll rate received from said means 2, by using a standard function that is parametrizable, but not necessarily linear.

The values φeff and Peff are measured with the aid of standard means forming part of said set 3 of information sources. Moreover, a threshold may be envisaged for the value φeff (for example ±0.5°), so as in particular not to needlessly extend airfoils on a cambered runway.

Furthermore, the coefficients or gains Ka, Kb and Kc are parametrizable, but not necessarily linear. These gains are chosen in such a way as to fix the dynamics of the response (frequency, damping, response time).

In a particular embodiment, said device 1 can calculate, moreover, a direct deflection order which satisfies the relation Kd.φcom, Kd being a predetermined coefficient. This direct deflection order is applied at one and the same time to said ailerons 11 and to spoilers (not represented) of the aircraft. However, this particular embodiment is only implemented in extreme cases and during manual piloting.

The second aforesaid embodiment therefore enables the pilot to control a roll angle, within a certain range of travel of the control stick 15. This angle is limited by values allowable on the ground, and its value is guaranteed by an integrator between the controlled angle φcom and the effective angle φeff. Beyond this range of travel of the control stick 15, the strongly nonlinear control enables the pilot to reach if necessary the airfoil stops, regardless of the value of the lateral attitude.

The invention claimed is:

1. A method of active control of a roll of an aircraft, comprising:
   a) generating a roll objective, which is expressed as a roll parameter related to the roll and which is applied to the aircraft;
   b) determining effective values of parameters of the aircraft;
   c) calculating a deflection order Sp on the basis of said roll objective and of said effective values; and
   d) applying said deflection order δp exclusively to airfoils of the aircraft, which are efficient on a roll axis, so as to control the roll,
   wherein in step c):
   a first value is calculated on the basis of said roll objective; and
   said deflection order δp is calculated on the basis of the first value and of said effective values which comprise the effective value of the roll rate, by using at least one integration function, and wherein
   c1) a roll acceleration order is calculated on the basis of said roll objective; and
   c2) said deflection order Sp is calculated with the aid of the following expressions:

$$\begin{cases} \delta p = \dfrac{(P1 - F + \Delta RMI)}{G} \\ F = \dfrac{\rho V^2 SlCl}{2I} \\ G = \dfrac{\rho V^2 Sl \left( \dfrac{\partial Cl}{\partial \delta p} \right)}{2 \cdot I} \\ \Delta RMI = K \left( -Peff + \int (F + G\delta peff - \Delta RMI) \cdot dt \right) \end{cases}$$

in which:
P1 represents said roll acceleration order;
ρ is the density of the air;
V is the speed of the aircraft;
S is a reference area of the aircraft;
l is a reference length of the aircraft;
Cl represents a roll coefficient;
I represents the roll inertia of the aircraft
∂Cl/∂δp represents an effectiveness coefficient;
K represents a predetermined coefficient;
Peff represents the effective value of the roll rate;
∫ illustrates an integration function; and
δpeff is the effective deflection angle of ailerons of the aircraft.

2. The method as claimed in claim 1, wherein in step a), said roll objective is generated by an automatic control device of the aircraft.

3. The method as claimed in claim 1, wherein in step a), said roll objective is generated by a stick system comprising a roll control stick which is configured to be actuated by a pilot of the aircraft.

4. The method as claimed in claim 1, wherein said roll objective is expressed as a roll angle.

5. The method as claimed in claim 1, wherein said roll objective is expressed as a roll rate.

6. The method as claimed in claim 1, wherein:
the effective value Peff of said roll rate is measured; and
in step c1), said roll acceleration order P1 is calculated with the aid of the following expression:

$$P1 = \omega(PO - Peff)$$

in which:
PO represents said roll objective; and
ω represents an adjustable angular frequency.

7. The method as claimed in claim 1, wherein said roll coefficient is determined with aid of a neural net.

8. The method as claimed in claim 1, wherein said effectiveness coefficient ∂Cl/∂δl is determined with the aid of a neural net.

9. A method of active control of a roll of an aircraft, comprising:
   a) generating a roll objective, which is expressed as a roll parameter related to the roll and which is applied to the aircraft;
   b) determining effective values of parameters of the aircraft;
   c) calculating a deflection order δp on the basis of said roll objective and of said effective values; and
   d) applying said deflection order δp exclusively to airfoils of the aircraft, which are efficient on a roll axis, so as to control the roll,
   wherein in step c):
   a first value is calculated on the basis of said roll objective; and
   said deflection order δp is calculated on the basis of the first value and of said effective values which comprise the effective value of the roll rate, by using at least one integration function,
   wherein in step c), said deflection order δp is calculated with aid of the following expression:

$$\delta p = Ka \int (\phi com - \phi eff) dt + Kb \phi eff + Kc Peff$$

in which:
Ka, Kb and Kc are predetermined coefficients;
∫ illustrates an integration function;
φeff is the effective value of the lateral attitude of the aircraft;

Peff is the effective value of the roll rate of the aircraft; and

φcom is a controlled value of the lateral attitude, which is determined with the aid of said roll parameter.

10. The method as claimed in claim 9, wherein said effective value φeff of a lateral attitude is limited by predetermined threshold values.

11. The method as claimed in claim 9, wherein a direct deflection order is calculated, and is applied at a same time to ailerons and to spoilers of the aircraft.

12. The method as claimed in claim 9, wherein in step a), said roll objective is generated by an automatic control device of the aircraft.

13. The method as claimed in claim 9, wherein in step a), said roll objective is generated by a stick system comprising a roll control stick which is configured to be actuated by a pilot of the aircraft.

14. The method as claimed in claim 9, wherein said roll objective is expressed as a roll angle.

15. The method as claimed in claim 9, wherein said roll objective is expressed as a roll rate.

16. A device for active control of a roll of an aircraft, said device comprising:

a generating device for generating a roll objective, which is expressed as a roll parameter related to the roll and which is applied to the aircraft;

a measuring device for measuring effective values of parameters of the aircraft;

a calculation device for calculating, on the basis of said roll objective and of said effective values, a deflection order; and an actuating device for actuating airfoils of the aircraft which are efficient on a roll axis, to which is transmitted said deflection order which is applied exclusively to said airfoils to control the roll of the aircraft, wherein said calculation device calculates:

on the basis of said roll objective, a first value;

said deflection order on the basis of the first value and of said effective values which comprise the effective value of the roll rate by using at least one integration function;

on the basis of said roll objective, a roll acceleration order; and said deflection order δp with the aid of the following expressions:

$$\begin{cases} \delta p = \dfrac{(P1 - F + \Delta RMI)}{G} \\ F = \dfrac{\rho V^2 SlCl}{2I} \\ G = \dfrac{\rho V^2 Sl\left(\dfrac{\partial Cl}{\partial \delta p}\right)}{2I} \\ \Delta RMI = K\left(-Peff + \int (F + G\delta peff - \Delta RMI) \cdot dt\right) \end{cases}$$

in which:

P1 represents said roll acceleration order;

ρ is the density of the air;

V is the speed of the aircraft;

S is a reference area of the aircraft;

l is a reference length of the aircraft:,

Cl represents a roll coefficient;

I represents the roll inertia of the aircraft;

∂Cl/∂δp represents an effectiveness coefficient;

K represents a predetermined coefficient;

Peff represents the effective value of the roll rate;

∫ illustrates an integration function; and

δpeff is the effective deflection angle of ailerons of the aircraft.

17. An aircraft, comprising a device as defined in claim 16.

18. A device for active control of a roll of an aircraft, said device comprising:

a generating device for generating a roll objective, which is expressed as a roll ammeter related to the roll and which is applied to the aircraft;

a measuring device for measuring effective values of parameters of the aircraft;

a calculation device for calculating, on the basis of said roll objective and of said effective values, a deflection order; and an actuating device for actuating airfoils of the aircraft which are efficient on a roll axis, to which is transmitted said deflection order which is applied exclusively to said airfoils to control the roll of the aircraft, wherein said calculation device calculates:

on the basis of said roll objective, a first value;

said deflection order on the basis of the first value and of said effective values which comprise the effective value of the roll rate by using at least one integration function; and said deflection order δp with the aid of the following expression:

$$\delta p = Ka\int(\phi com - \phi eff)dt + Kb\phi eff + Kc Peff$$

in which:

Ka, Kb and Kc are predetermined coefficients;

∫ illustrates an integration function;

φeff is the effective value of the lateral attitude of the aircraft;

Peff is the effective value of the roll rate of the aircraft; and

φcom is a controlled value of the lateral attitude, which is determined with the aid of said roll parameter.

\* \* \* \* \*